US011605059B2

(12) United States Patent
Benjamin et al.

(10) Patent No.: US 11,605,059 B2
(45) Date of Patent: Mar. 14, 2023

(54) SOFTWARE SYSTEM UTILIZING BLOCKCHAIN FOR TRANSACTIONS

(71) Applicant: SAP SE, Walldorf (DE)

(72) Inventors: Thomas Benjamin, Palo Alto, CA (US); Sriram Narasimhan, Palo Alto, CA (US); Abhay Saswade, Palo Alto, CA (US); Gireesh Malaksamudra, Palo Alto, CA (US)

(73) Assignee: SAP SE, Walldorf (DE)

( * ) Notice: Subject to any disclaimer, the term of this patent is extended or adjusted under 35 U.S.C. 154(b) by 231 days.

(21) Appl. No.: 16/208,345

(22) Filed: Dec. 3, 2018

(65) Prior Publication Data

US 2020/0042963 A1 Feb. 6, 2020

Related U.S. Application Data

(60) Provisional application No. 62/714,539, filed on Aug. 3, 2018.

(51) Int. Cl.
*G06Q 20/08* (2012.01)
*G06Q 20/38* (2012.01)
(Continued)

(52) U.S. Cl.
CPC ..... *G06Q 20/0855* (2013.01); *G06Q 20/3825* (2013.01); *G06Q 20/4037* (2013.01);
(Continued)

(58) Field of Classification Search
CPC ........... G06Q 20/0855; G06Q 20/3825; G06Q 20/4037; G06Q 2220/00; H04L 9/3255;
(Continued)

(56) References Cited

U.S. PATENT DOCUMENTS 6,546,133 B1 * 4/2003 Temkin ................ G06F 17/21
382/173
8,233,751 B2 * 7/2012 Patel ..................... G06Q 40/02
709/225

(Continued)

FOREIGN PATENT DOCUMENTS

WO WO-2017163220 A1 * 9/2017 ............. G06Q 20/02
WO WO-2022105498 A1 * 5/2022 ........... G06F 21/602

OTHER PUBLICATIONS

"An Approach to Decentralized Computer Systems"; James N. Gray; IEEE Transactions on Software Engineering, vol. SE-12, No. 6, Jun. 1986 (Year: 1986).*

(Continued)

*Primary Examiner* — John W Hayes
*Assistant Examiner* — Edgar R. Martinez-Hernandez
(74) *Attorney, Agent, or Firm* — Klarquist Sparkman, LLP

(57) ABSTRACT

Systems and methods are describe herein for managing a transaction between two parties. A distributed ledger management service (DLMS) microservice receives an electronic document pertaining to a transaction from a user. The electronic document includes transactional data. A document type is determined by the DLMS microservice. A portion of the transactional data is extracted from the electronic document based on the document type. The portion of the transactional data is provided to a distributed ledger node for decentralized storage and further reporting to a third party.

19 Claims, 7 Drawing Sheets

(51) Int. Cl.
*H04L 9/32* (2006.01)
*G06Q 20/40* (2012.01)
*H04L 9/00* (2022.01)

(52) U.S. Cl.
CPC ....... *H04L 9/3255* (2013.01); *G06Q 2220/00* (2013.01); *H04L 9/3239* (2013.01); *H04L 9/50* (2022.05); *H04L 2209/56* (2013.01)

(58) Field of Classification Search
CPC .................. H04L 2209/38; H04L 2209/56; H04L 9/3239
See application file for complete search history.

(56) References Cited

U.S. PATENT DOCUMENTS

| | | | |
|---|---|---|---|
| 2002/0091539 A1* | 7/2002 | Yin ................. | G06Q 10/00 705/7.38 |
| 2011/0022520 A1* | 1/2011 | Ginter .............. | H04N 7/162 705/51 |
| 2017/0076306 A1* | 3/2017 | Snider ............. | G06Q 30/0205 |
| 2017/0118301 A1* | 4/2017 | Kouru .............. | H04L 67/06 |
| 2017/0200137 A1* | 7/2017 | Vilmont ........... | G06Q 30/0213 |
| 2017/0213209 A1* | 7/2017 | Dillenberger .... | G06Q 20/38 |
| 2017/0352116 A1* | 12/2017 | Pierce ............. | H04L 65/613 |
| 2018/0060927 A1* | 3/2018 | Gupta .............. | G06Q 20/047 |
| 2018/0191685 A1* | 7/2018 | Bajoria ............ | H04L 51/224 |
| 2018/0196694 A1* | 7/2018 | Banerjee .......... | G06F 9/466 |
| 2018/0247302 A1* | 8/2018 | Armstrong ....... | G06Q 20/3827 |
| 2018/0285996 A1* | 10/2018 | Ma .................. | H04L 9/3297 |
| 2019/0130392 A1* | 5/2019 | Kale ................ | G06Q 20/36 |
| 2019/0279173 A1* | 9/2019 | Marchetto ....... | G06Q 20/4014 |
| 2020/0005292 A1* | 1/2020 | Mao ................ | H04L 9/3247 |
| 2020/0019421 A1* | 1/2020 | Sun ................. | H04L 9/50 |
| 2020/0028688 A1* | 1/2020 | Takada ............ | H04L 9/3239 |
| 2020/0050797 A1* | 2/2020 | Suh ................. | G06F 21/64 |
| 2020/0349194 A1* | 11/2020 | Kundu ............. | G06F 16/903 |
| 2021/0294914 A1* | 9/2021 | Nagano ........... | G06F 9/466 |
| 2021/0319436 A1* | 10/2021 | Ow .................. | H04L 9/3239 |
| 2021/0352142 A1* | 11/2021 | Jayaram .......... | G06Q 20/108 |
| 2022/0045930 A1* | 2/2022 | Williams ......... | H04L 43/16 |

OTHER PUBLICATIONS

"The Blockchain as a Software Connector"; Xiwei Xu, Cesare Pautasso, Liming Zhu, Vincent Gramoli, Alexander Ponomarev, Shiping Chen; 2016 13th Working IEEE/IFIP Conference on Software Architecture (Year: 2016).*

"Understanding Modern Banking Ledgers through Blockchain Technologies: Future of Transaction Processing and Smart Contracts on the Internet of Money"; Gareth W. Peters, Efstathios Panayi; (Year: 2015).*

"VSK Chains: Integrated Content and Currency Transaction Blockchains"; C. E. Veni Madhavan, Ch. Srikanth, and H.V. Kumar Swamy; 2017 23rd Annual Conference on Advanced Computing and Communications (Year: 2017).*

"Consensus Algorithms: the essential forces of the DLT Universe," dated Apr. 24, obtained from the Internet on Dec. 3, 2018 (4 pages).

Stevens, "Distributed ledger consensus explained," dated Apr. 29, obtained from the Internet on Dec. 3, 2018 (5 pages).

Valenta and Sandner, "Comparison of Ethereum, Hyperiedger Fabric and Corda," Frankfurt School Blockchain Center, dated Jun. 2017, pp. 1-8.

* cited by examiner

SOFTWARE SYSTEM UTILIZING BLOCKCHAIN FOR TRANSACTIONS

CROSS-REFERENCE TO RELATED APPLICATION

This application claims priority to U.S. Application No. 62/714,539, filed Aug. 3, 2018, the entire contents of which is incorporated herein by reference.

TECHNICAL FIELD

The subject matter described herein relates to transaction applications of blockchain technology.

BACKGROUND

Procure to pay is a process by which raw materials are obtained and managed in order to provide a service or manufacture a product. The procure to pay process involves multiple transactions between a buyer, a supplier, and/or other potential participants such as a shipping agent or shipper. A dynamic, digital marketplace can automate business transactions and processes, and route business documents that capture various business transactions such as procure to pay. Business transactions using this market place can be subject to various complex costs associated with procure to pay such as value added tax (VAT). Additionally, such transactions can be subject to various import/export compliance controls.

SUMMARY

In one aspect, a transaction between two parties is managed. A distributed ledger management service (DLMS) microservice receives an electronic document pertaining to a transaction from a user. The electronic document includes transactional data. A document type is determined by the DLMS microservice. A portion of the transactional data is extracted from the electronic document based on the document type. The portion of the transactional data is provided to a distributed ledger node for decentralized storage and further reported to a third party.

In some variations, submission of the portion of the transactional data or the electronic document from the distributed ledger node to the third party can be initiated. The distributed ledger node can include at least one of a hyperledger node or a blockchain node. The transactional data can include at least one of a party identification, a DLT node identification, or a location of a party or node.

In other variations, the portion of the transactional data can be provided to the third party for reporting. The portion of transactional data extracted can be based on an enumerated list defining required information for the document type for reporting to the third party.

In some variations, the DLMS microservice can store the electronic document in a database.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, in applying the software architecture described herein to incorporate blockchain technology, a business can decrease operational costs incurred through potential fines/penalties from various tax authorities, reduce tax overpayment, increase cash flow, increase corporate productivity by requiring less focus on tax compliance issues, and/or support business expansion efforts into other countries with different VAT regimes. Additionally, use of the architecture described herein can reduced the amount of manual effort required to comply with VAT requirements and/or reduce loss associated with VAT fraud due to undervalued or miscategorized goods.

Using the subject matter described herein can also provide immutability or tamper-proof transactional data, which in turn can increase the integrity of reported business transaction information. Data privacy can also be provided using the subject matter herein through sharing of data only to involved parties, and enabling parties involved in the transaction to transact directly. The subject matter described herein also provides an interoperable, open network that allows the parties to seamlessly collaborate and transact using smart contracts.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

A dynamic, digital marketplace utilizing blockchain technology can provide for tamperproof data records of various business transactions. The system architecture as described herein utilizes Distributed Ledger Technology (DLT) or blockchain technology. DLT can provide trust and transparency of various business transactions performed between multiple parties and associated data. Transactions can be performed in distributed fashion among participants involved in a particular business flow. Additionally, transactions and associated data can also be made available to authorized government agencies, such as tax agencies or import/export compliance agencies. In other words, the subject matter described herein can enable relevant data regarding business transactions to be made available to direct parties and authorized indirect parties. Direct parties can include a buyer or supplier, for example. Indirect parties can include various tax authorities, shippers, carriers, or import/export compliance authorities, for example.

In one application example, oversight and audit of business transactions using a system architecture that utilizes blockchain can ensure the accuracy and recovery of potential evasions or gaps in the taxes due to the tax authorities. Calculating and filing VAT relies upon exchange of documents to substantiate the accuracy and authenticity of the transaction between buyers and suppliers involved in the procurement process.

In another example application, the cross-border custom clearance and logistics process can be similarly simplified and streamlined using the DLT solution described herein. The documents supporting the shipment of the goods across country or relevant borders can be exchanged with the appropriate parties within and across the DLT network such that the records are tamper proof.

Provenance of material for track and trace is another business application that can be handled using the subject matter described herein. This can be achieved with the transactions recorded in various tax and customs flows.

Figure 1:
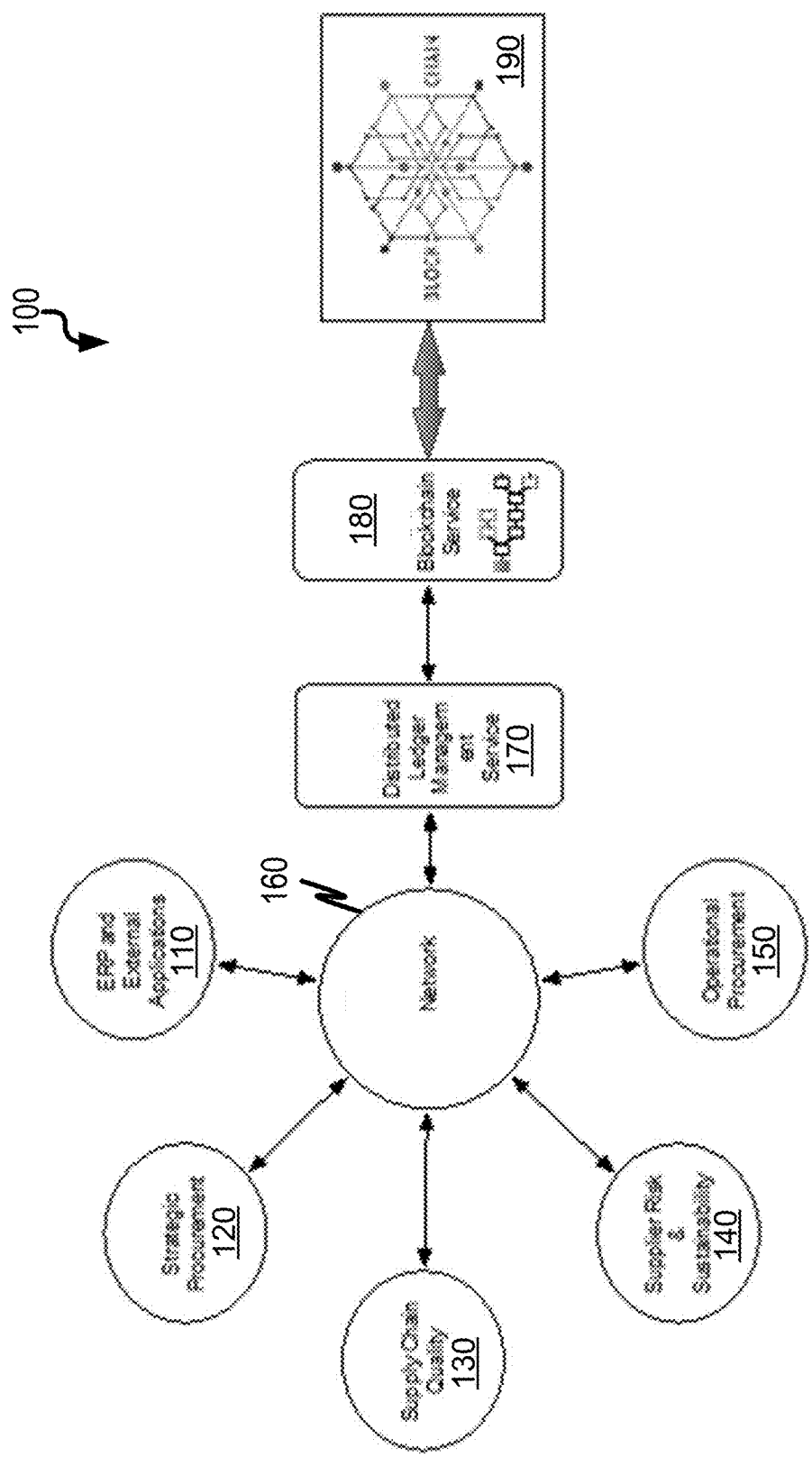
FIG. 1 is an example data architecture illustrating data flow between various applications and the distributed ledger management service.

FIG. 1 is an example data architecture 100 illustrating data flow between various applications and a distributed ledger management service (DLMS). One or more applications, such as enterprise resource planning (ERP) and external applications 110, strategic procurement applications 120, supply chain quality applications 130, supplier risk and sustainability applications 140, and/or operational procurement applications 150, can interface with a network 160. The one or more applications can exchange business transactional information using network 160. Network 160 can be configured to include customer (e.g., buyer and supplier) identity information to facilitate recording of business transaction information in blockchain 190. Additionally, network 160 can be configured to identify which documents and various attributes of the document should be recorded within blockchain 190.

Users can use the one more applications to conduct procurement processes ranging from sourcing suppliers to settling invoices for goods procured from suppliers. ERP and external applications 110 can be used to directly interact with network 160 to initiate and/or participate in the procurement process. Strategic procurement applications 120 can be used to manage and/or analyze the contracting process. Supply chain quality applications 130 can be used to manage the supply chain. Supplier risk and sustainability applications 140 can be used to manage suppliers with a view on spending, risk, and/or performance. Operational procurement applications 150 can be used to manage the procure to pay cycle.

The one or more applications can exchange documents such as commerce extensible markup language (cXML) documents or other document formats with network 160.

Network 160 can exchange data with DLMS 170. The data can include relevant information based on a document type, as described in more detail in FIG. 2. Blockchain service 180 can interface between DLMS 170 and blockchain 190.

Figure 2:
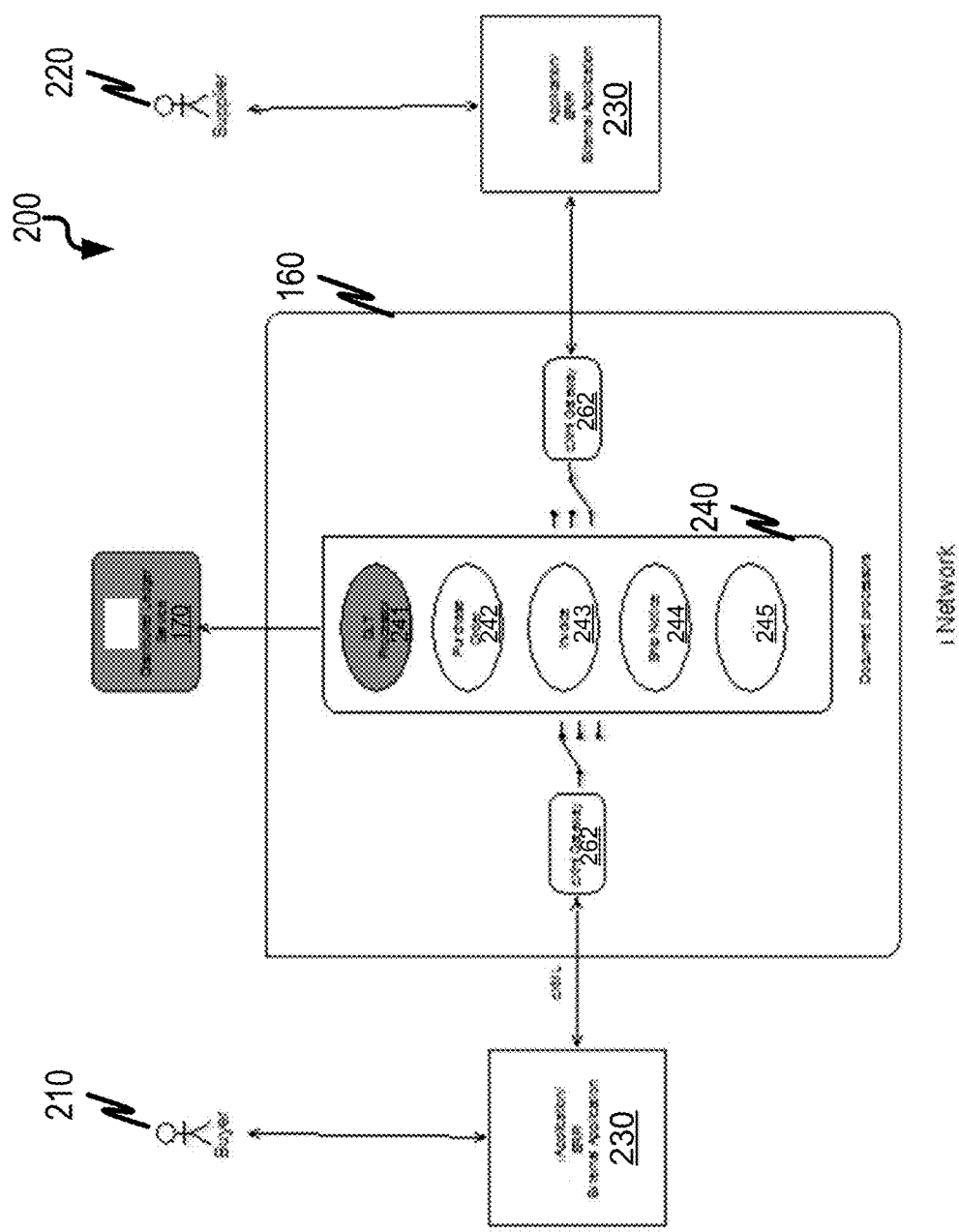
FIG. 2 is a system block diagram illustrating processing of various documents generated by or provided to network from one or more applications.

FIG. 2 is a system block diagram 200 illustrating processing of various documents generated by or provided to network 160 from one or more applications (e.g., ERP and external applications 110, strategic procurement applications 120, supply chain quality applications 130, supplier risk and sustainability applications 140, and/or operational procurement applications 150 can interface with a network 160). Network 160 can receive a document (e.g., electronic document) from a user (e.g., buyer 210 or supplier 220) via one or more applications 230 (e.g., ERP and external applications 110, strategic procurement applications 120, supply chain quality applications 130, supplier risk and sustainability applications 140, and/or operational procurement applications 150 can interface with a network 160). The electronic document can pertain to a transaction and include transactional data relevant to that transaction. The one or more applications 230 can generate a document format such as cXML, if the input file from buyer 210 or seller 220 is not already in such a format. The cXML document is processed by a cXML gateway 262. Network 160 via cXML gateway 262 can route the document to a relevant document processors (e.g., document processors 240 based on the document type). For example, cXML gateway 262 can determine a document type based on, for example, the document format or the content of the document. CXML gateway 262 can route a purchase order to purchase order processor 242, an invoice to invoice processor 243, a shipping notice to ship notice processor 244, or other documents to one or more additional document processors 245. The document itself can be persisted in a transaction repository pre-processing and/or post-processing (not shown in FIG. 2). In addition to being sent to an appropriate document processor 240, the document is also sent to DLT processor 241. DLT processor 241 can extract relevant information from the document and record such information within a distributed ledger based on the configuration. The relevant information for each document can be, for example, enumerated information based on the document type that is relevant to a particular application such as VAT reporting or import/export control compliance reporting. DLT processor 241 can interface with DLMS 170 to further store the information in a decentralized fashion so as to prevent tampering. For example, multiple instances of information from a document can be stored across multiple nodes. An algorithm, such as a consensus algorithm, can determine the validity of the information stored in each node by confirming "truth" between all nodes. In other words, the information being stored on multiple nodes can decentralize the information as it is not stored on a single node. Tampering of the information can be difficult as such tampering of information on a single node will fail an algorithmic check of its validity when compared to the information stored on other nodes which have not been tampered with. As such, information can be difficult as it would have to occur on a majority of the nodes storing the information to get past a consensus algorithm. The document, after being processed, can be routed to the appropriate buyer 210 or supplier 220 again based on various routing rules and configurations.

Figure 3:
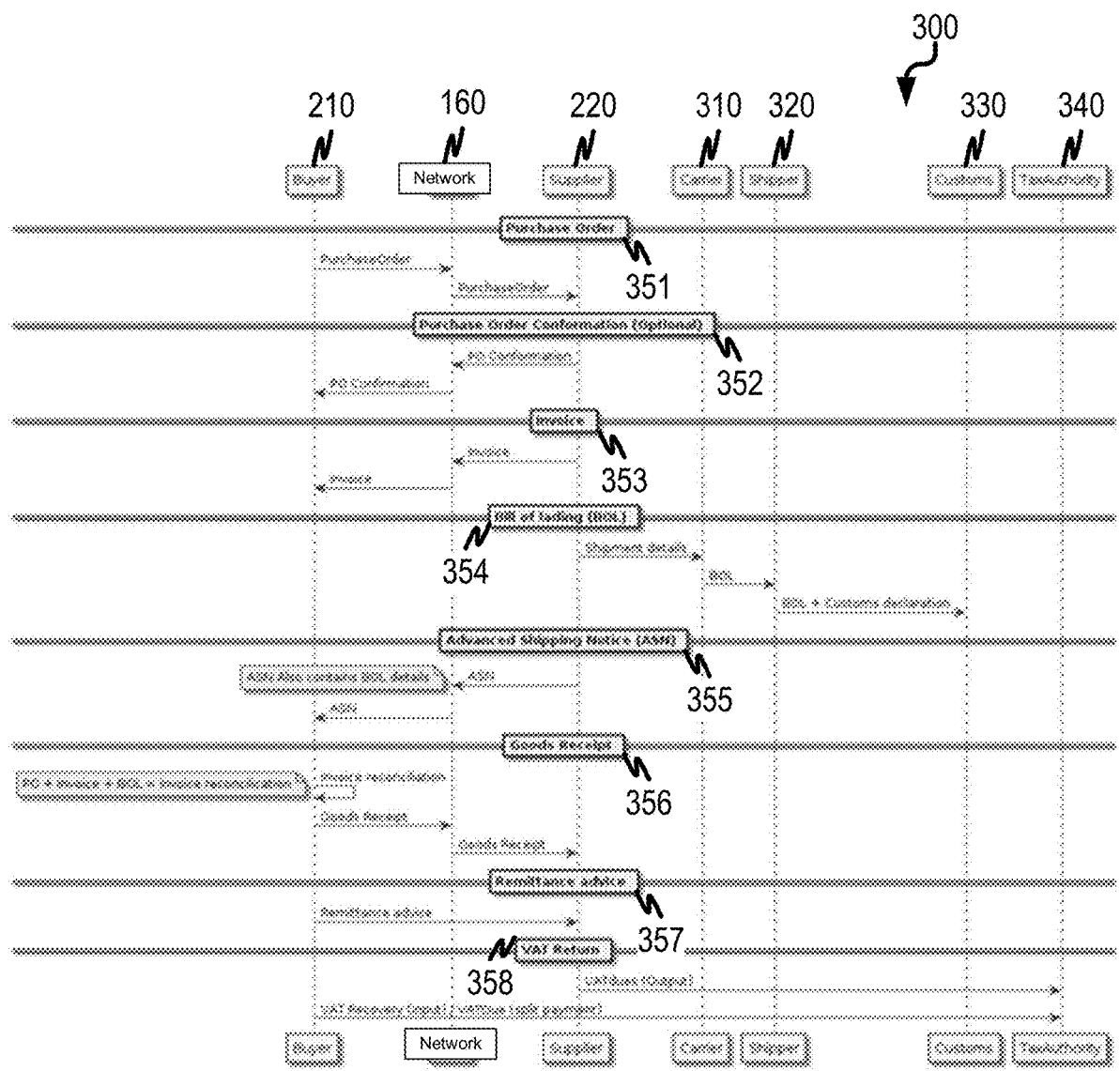
FIG. 3 is a process flow diagram illustrating information flow between various direct and indirect parities of a business transaction relating to VAT reporting.

FIG. 3 is a process flow diagram 300 illustrating information flow between various direct and indirect parities of a business transaction relating to VAT reporting. In this example, as part of the procurement process, a buyer 210 can create a Purchase Order (PO) 351 for items required to be fulfilled by the supplier 220. DLMS 170 can initiate a process flow to create PO 351 state on behalf of the buyer 210. The process flow described herein between buyer 210 and seller 220 can be facilitated via network 160. The PO 351 can be validated with an associated smart contract to ensure compliance. Once in compliance, authorizations/signatures from all the parties involved (e.g., buyer 210 and supplier 220) with the transaction can be collected. PO 351 can persist in an immutable ledger of both buyer 210 and supplier 220.

Optionally, in some variations, the PO 351 can be acknowledged by the supplier 220 via purchase order confirmation 352. A process flow can be initiated to communicate either an accept or reject response back to the buyer 210. Purchase order confirmation 352 can be evaluated against the smart contract and the involved parties can sign the transaction. Purchase order confirmation 352 can then be committed into the ledger of both buyer 210 and seller 220.

The one or more items ordered in the PO 351 can then shipped to the buyer 210 (not shown). Before or after shipment, an invoice 353 can be created by the supplier 220. DLMS 170, on behalf of supplier 220, can initiate the process flow to create an invoice 353. The validity of the associated invoice 353 can be verified either manually by the buyer 210 or automatically against an executed smart contract. Signatures of the buyer 210 and seller 220 can be collected electronically. After the signature collection, the invoice 353 can be committed into the distributed ledger.

Optionally, in some variations, an advance shipping notice 355 can be generated and sent from the supplier 220 to the buyer 210. The buyer 210 can send back a goods receipt 356 identifying the received one or more goods to supplier 220. In some variations, a bill of lading 354 can be generated by supplier 220 based on the goods shipped to buyer 210. This bill of lading 354 can, in some variations, be provided to a customs authority 330 for necessary import/export compliance. Remittance advice 357 can be generated by buyer 210 confirming when invoice 353 is paid.

In some variations, periodically, the supplier 220 can file a VAT return 358 with the appropriate tax authorities (e.g., tax authority 340). The VAT return 358 reports the amounts paid and/or owed tax amounts based on the business transactions performed during a VAT declaration period. DLMS 170, on behalf of supplier 220, can initiate a process flow to submit the VAT return 358 with the applicable tax authorities. DLMS 170 can also initiate a process flow to submit the supporting invoices associated with the VAT return 358. The supporting invoices and/or VAT return 358 can be duly signed by the parties (e.g., buyer 210 and seller 220) involved within the transaction which can be tamper proof as a result of use of the subject matter described herein. Similarly, in some variations, the buyer 210 can also initiate a process flow to submit the VAT return 358 for one or more transactions performed during the VAT declaration period.

Figure 4:
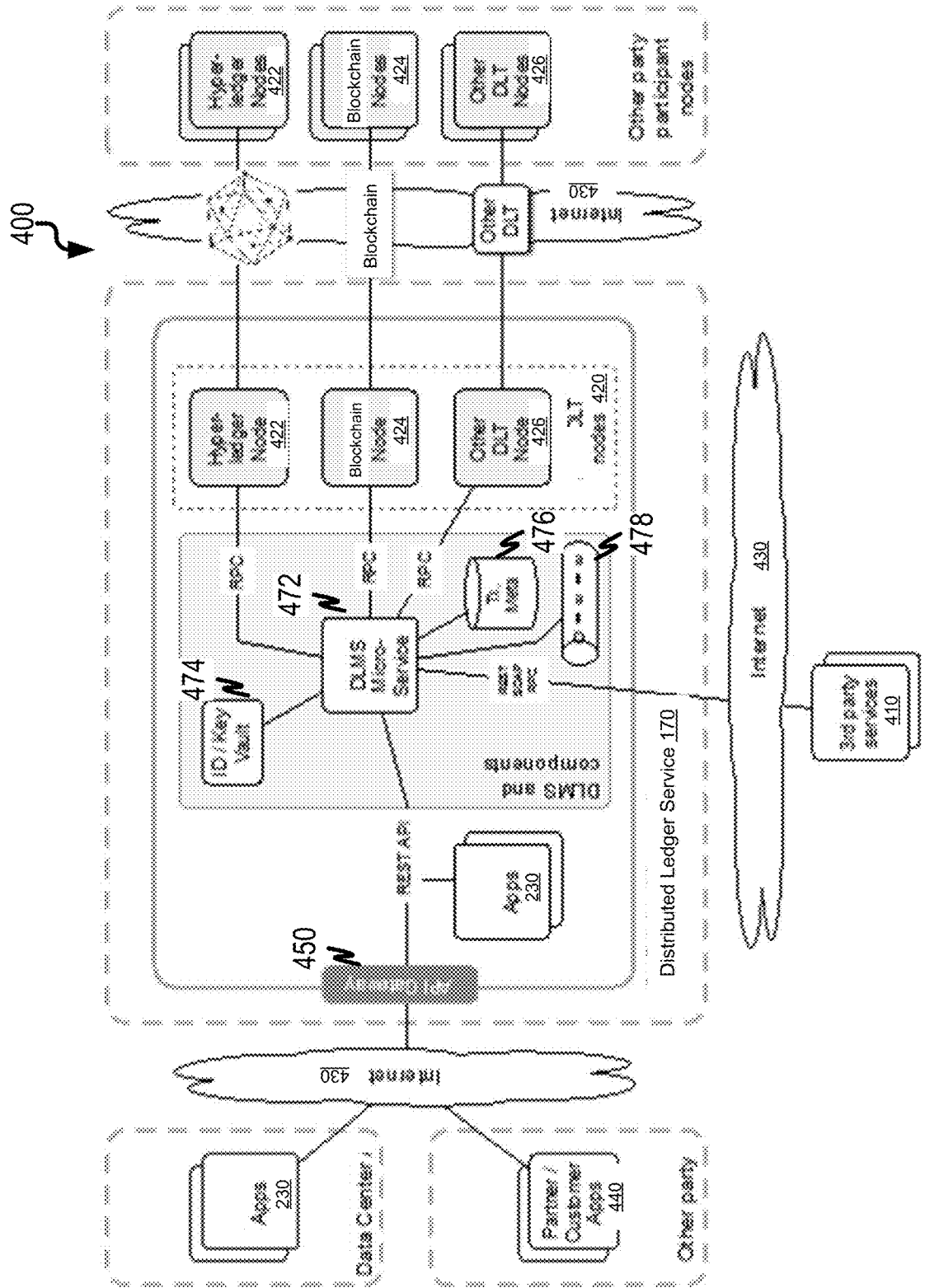
FIG. 4 is a software architecture diagram in connection with the subject matter described herein.

FIG. 4 is an example software architecture diagram 400 in connection with the subject matter described herein. DLMS 170 can include a DLMS microservice 472, ID/key vault 474, database 276, and queue 478. DLMS microservice 472 can be a Java or Kotlin based microservice either hosted in a data center or in a cloud service. DLMS microservice 472 can also invoke other 3rd party services. DLMS microservice 472 can produce and/or consume messages from a messaging queue (e.g., queue 478), notify applications 230 about external node initiated transaction (e.g., via partner/customer applications 440), secure communications and protect data using authentication/authorization capabilities, and/or support administrative operations such as adding/updating/removing party, node, party, certificates, and/or data.

ID/key vault 474 can manage DLT specific party identities stored within ID/key vault 474. ID/key vault 474 can store sensitive data such as secretes, passwords, certificates, and/or other secured data. DLMS microservice 472 can also interface with queue 478 for inter-process messaging mainly with one or more applications 230.

Database 476 can store various transactional data and/or metadata such as persisting DLT metadata (e.g., party id, node id, location of the other nodes/parties) or other DLT transaction specific information. Database 476 can be an external database, an in-memory database, relationship database management system (RDBMS), and/or a non-relational (NoSQL) database. Information and/or data can also be synched to database 476 when transaction is originated from other DLT nodes 426.

DLMS 170 can call one or more DLT nodes 420 using, for example, a remote procedure call (RPC) or any others means supported by the DLT nodes 420. One or more DLT nodes 420 can include a number of different types such as hyperledger node 422, blockchain node 424, and/or other DLT nodes 426. A choice of DLT node 420 can be determined by the network's needs, buyer/supplier needs, and/or tax authority needs. For example a buyer 210 and supplier 220 can use a blockchain node 424. Alternatively, a tax authority might utilize a hyperledger node 422 or other types of DLT nodes 426. DLMS 170 can automatically select a particular node (e.g., hyperledger node 422, blockchain node 424, or other DLT node 426) based on a configuration file within DLS 170. The configuration file can provide a mapping of which document (based on document type) correlates to a particular node (e.g., hyperledger node 422, blockchain node 424, or other DLT node 426). With this node mapping, DLMS 170 can mitigate the use of multiple DLT nodes 420 by providing a consistent, seamless interface to one or more applications (e.g., applications 230, either internal to DLMS 170 or external to DLMS 170, or partner/customer applications 440) by means of application programming interface (API) gateway 450 and/or internet 430. A one to one correlation between a particular node and a document type can mitigate the use of multiple node assignments which may not be able to handle the information properly. API gateway 450 can protect DLMS 170 from various cyber security attacks by permitting only authorized software clients to communicate with DLMS 170.

Interaction between other party participant nodes can be transparent to applications 230 and/or partner/customer applications 440 due to the communication through DLMS 170. DLMS 170 can determine and use an appropriate protocol for interacting with the various DLT node 420 (e.g., hyperledger node 422, blockchain node 424, and/or other DLT node 426) based on the mapping provided in a configuration file. This mapping can be transparent to a user. For example, a document between a buyer 210 and supplier 220 can be mapped accordingly within the configuration file to use a blockchain node 424. Alternatively, a document for a tax authority can be mapped accordingly within the configuration file to utilize a hyperledger node 422 or other types of DLT nodes 426.

In addition to interfacing with various software components as described above, DLMS 170 also can ensure that the various business transactions are compliant with Atomicity, Consistency, Isolation, Durability (ACID). DLMS 170 can also manage synchronous as well as asynchronous transactional components and ephemeral data related to various transactions. DLMS 170 can communicate via internet 430 to one or more third party services regarding information such as various tax calculations for particular locations.

Figure 5:
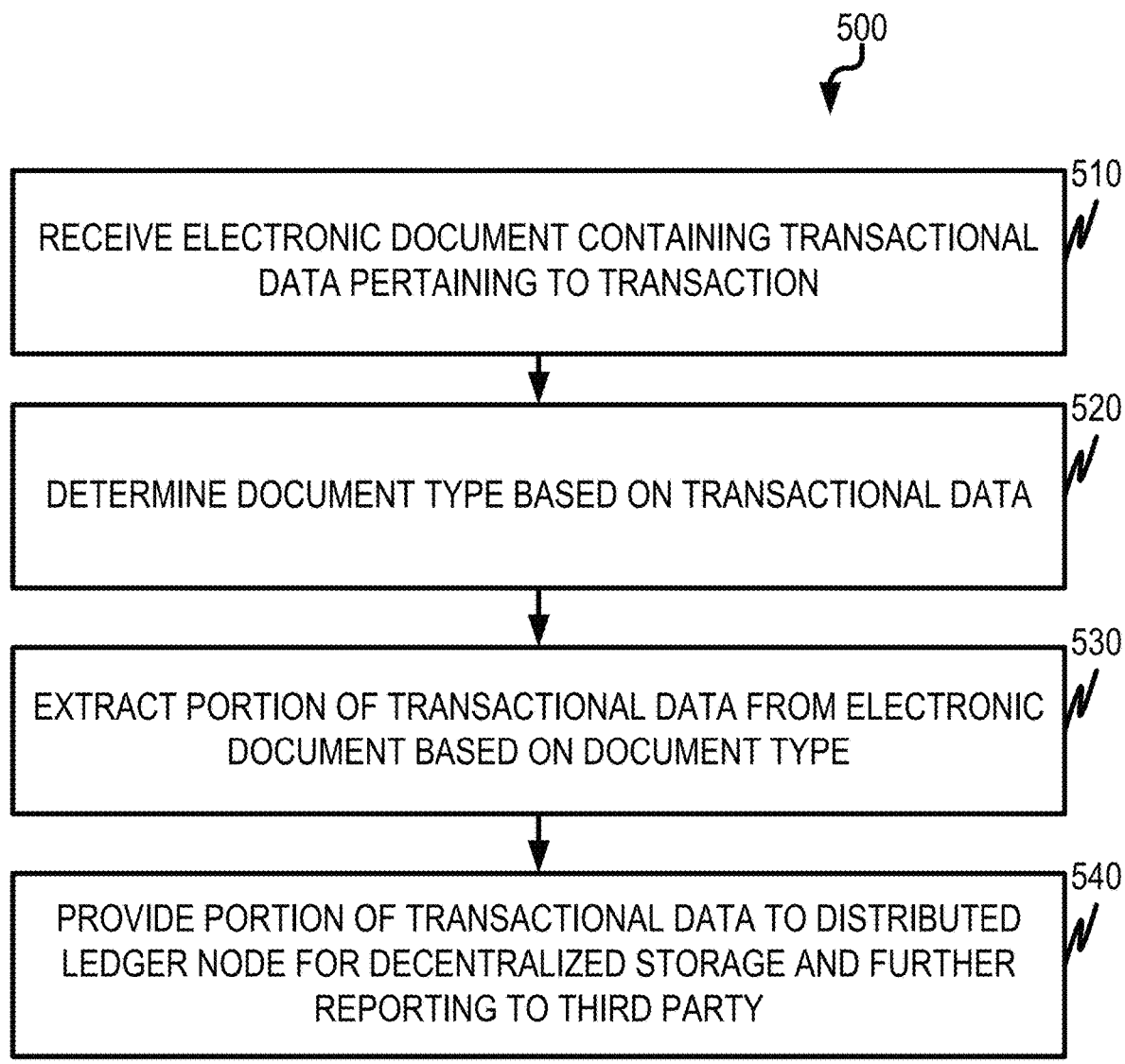
FIG. 5 is a process flow diagram illustrating management of a transaction.

FIG. 5 is a process flow diagram 500 illustrating management of a transaction between two parties. A DLMS microservice 472 receives, at 510, an electronic document pertaining to a transaction from a user. The electronic document includes transactional data relevant to the transaction. Based on the transactional data, the DLMS microservice 472 determines, at 520, a document type. A portion of the transactional data relevant to reporting to authorities such as a tax authority or an import/export compliance authority, is extracted, at 530, from the electronic document based on the document type. Extraction of a portion of the document rather than the entire document can save processing resources of the computing device. Additionally, in some cases, only a portion of a document may be relevant for providing to third parties. A hash of the entire document can be stored within DLS 170. This hash can indicate a location of the document so that it can be accessed in the event the unextracted portion is required. An enumerated list can identify relevant information for extraction for each document type. The portion of the transactional data is provided, at 540, to a distributed ledger node (e.g., DLT nodes 420) for decentralized storage and further reporting to a third party, such as a third party.

Figure 6:
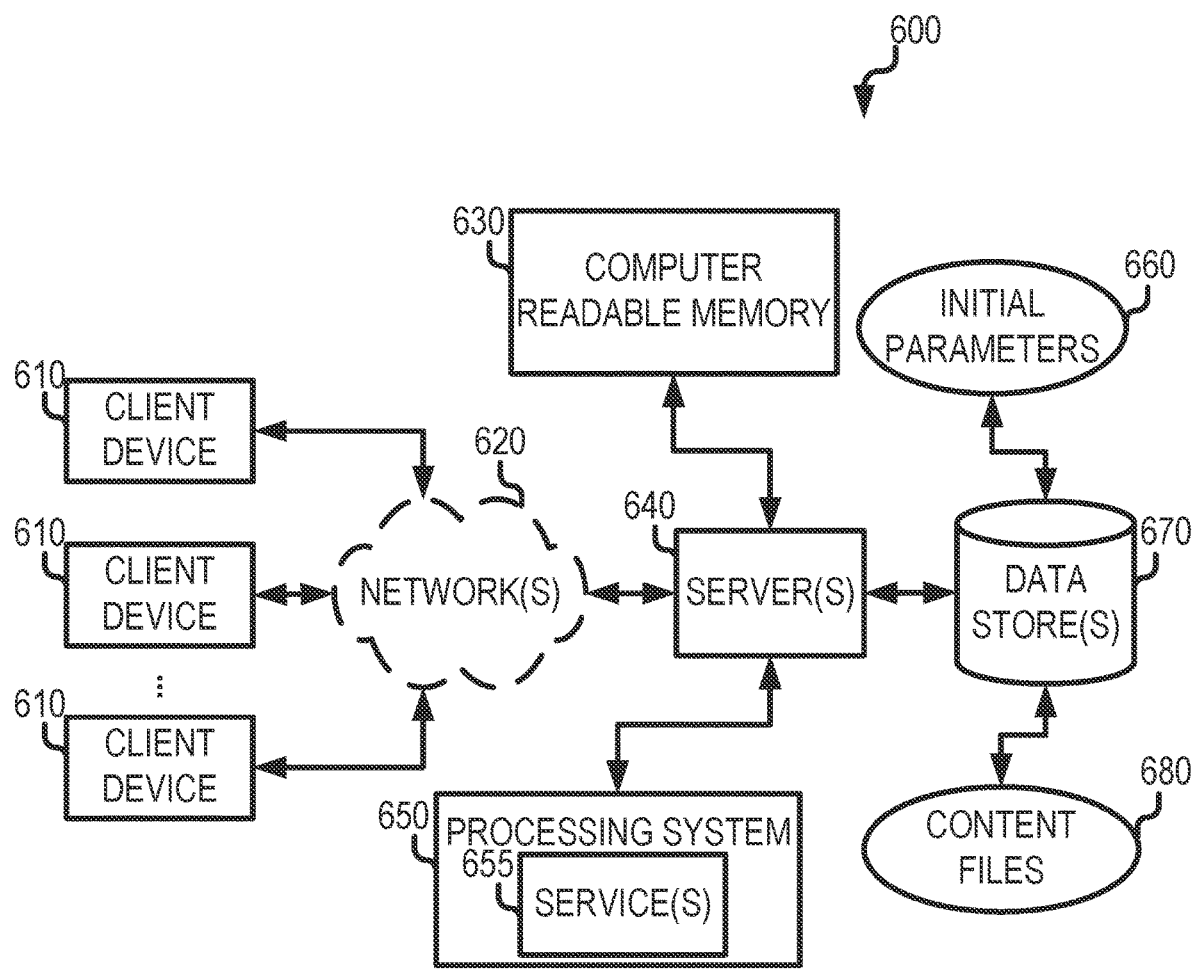
FIG. 6 is a diagram illustrating an example implementation system of a client-server architecture for use in connection with the current subject matter.

FIG. 6 is a diagram illustrating an example implementation system 600 of a client-server architecture for use in connection with the current subject matter. One or more client devices 610 access one or more servers 640 running one or more services 655 on a processing system 650 via one or more networks 620. Alternatively, client device 610 and server 640 can be the same computing device eliminating the need for network 620. Client application can be deployed and/or run on one or more client devices 610 or processing system 650. One or more servers 640 can access computer-readable memory 630 as well as one or more data stores 670. One or more data stores 670 can include initial parameters 660 as well as content files 680.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random access memory associated with one or more physical processor cores.

Figure 7:
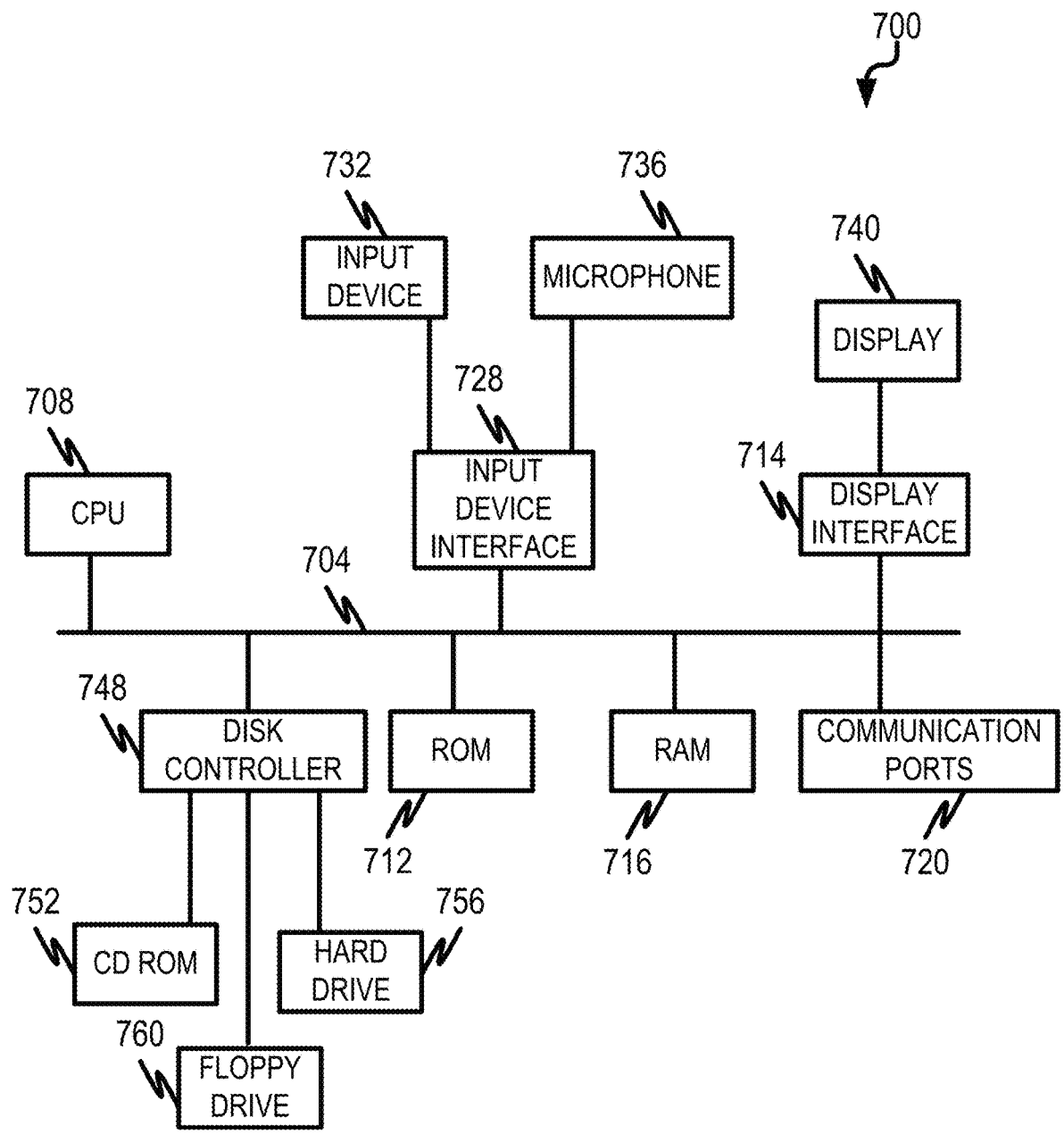
FIG. 7 is a diagram illustrating a sample computing device architecture for implementing various aspects described herein.

FIG. 7 is a diagram 700 illustrating a sample computing device architecture for implementing various aspects described herein. A bus 704 can serve as the information highway interconnecting the other illustrated components of the hardware. A processing system 708 labeled CPU (central processing unit) (e.g., one or more computer processors/data processors at a given computer or at multiple computers), can perform calculations and logic operations required to execute a program. A non-transitory processor-readable storage medium, such as read only memory (ROM) 712 and random access memory (RAM) 716, can be in communication with the processing system 708 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 748 can interface one or more optional disk drives to the system bus 704. These disk drives can be external or internal floppy disk drives such as 760, external or internal CD-ROM, CD-R, CD-RW or DVD, or solid state drives such as 752, or external or internal hard drives 756. As indicated previously, these various disk drives 752, 756, 760 and disk controllers are optional devices. The system bus 704 can also include at least one communication port 720 to allow for communication with external devices either physically connected to the computing system or available externally through a wired or wireless network. In some cases, the communication port 720 includes or otherwise comprises a network interface.

To provide for interaction with a user, the subject matter described herein can be implemented on a computing device having a display device 740 (e.g., a CRT (cathode ray tube) or LCD (liquid crystal display) monitor) for displaying information obtained from the bus 704 to the user and an input device 732 such as keyboard and/or a pointing device (e.g., a mouse or a trackball) and/or a touchscreen by which the user can provide input to the computer. Other kinds of input devices 732 can be used to provide for interaction with a user as well; for example, feedback provided to the user can be any form of sensory feedback (e.g., visual feedback, auditory feedback by way of a microphone 736, or tactile feedback); and input from the user can be received in any form, including acoustic, speech, or tactile input. In the input device 732 and the microphone 736 can be coupled to and convey information via the bus 704 by way of an input device interface 728. Other computing devices, such as dedicated servers, can omit one or more of the display 740 and display interface 714, the input device 732, the microphone 736, and input device interface 728.

To provide for interaction with a user, the subject matter described herein can be implemented on a computer having a display device (e.g., a CRT (cathode ray tube) or LCD (liquid crystal display) monitor) for displaying information to the user and a keyboard and a pointing device (e.g., a mouse or a trackball) and/or a touchscreen by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method, the method comprising:
    receiving, by a distributed ledger management service (DLMS) microservice executed by one or more data processors, an electronic document comprising transactional data;
    determining, by the DLMS microservice based on the transactional data, a document type;
    extracting, by the DLMS microservice, a portion of the transactional data from the electronic document based on the document type;
    storing, by the DLMS microservice, multiple instances of the portion of the transactional data on a plurality of distributed ledger nodes on a network, wherein the storing comprises selecting a type of the plurality of distributed ledger nodes from among different types of distributed ledger nodes on the network based on the document type;
    determining, by the DLMS microservice, a validity of the instance of the portion of the transactional data stored on at least one of the plurality of distributed ledger nodes to detect tampering of the portion of the transactional data, the determining of the validity based on comparing the instance of the portion of the transactional data stored on the at least one of the plurality of the distributed ledger nodes against the instances of the portion of the transactional data stored on others of the plurality of distributed ledger nodes; and
    providing, by the DLMS microservice, after the determining of the validity, the portion of the transactional data to an external node.

2. The method of claim 1, further comprising transmitting, by the DLMS microservice, the electronic document to the external node.

3. The method of claim 1, wherein the portion of the transactional data is extracted based on an enumerated list defined by a third party, and further comprising providing the portion of the transactional data to the external node for transmission to the third party.

4. The method of claim 1, wherein the portion of transactional data extracted is based on an enumerated list defining required information for the document type.

5. The method of claim 1, wherein the plurality of distributed ledger nodes comprise at least one of a hyperledger node or a blockchain node.

6. The method of claim 1, further comprising storing, by the DLMS microservice, the electronic document in a database.

7. The method of claim 1, wherein the transactional data includes at least one of a party identification, a distributed ledger technology (DLT) node identification, or a location of a party or node.

8. The method of claim 1, wherein the external node interfaces with the DLMS microservice based on the document type.

9. A system comprising:
    at least one data processor; and
    memory storing instructions, which when executed by at least one data processor, result in operations comprising:
        receiving an electronic document comprising transactional data;
        determining a document type;
        extracting a portion of the transactional data from the electronic document based on the document type;
        storing multiple instances of the portion of the transactional data on a plurality of distributed ledger nodes on a network, wherein the storing comprises selecting a type of the plurality of distributed ledger nodes on the network from among different types of distributed ledger nodes based on the document type;
        determining a validity of the instance of the portion of the transactional data stored on at least one of the plurality of distributed ledger nodes to detect tampering of the portion of the transactional data, the determining of the validity based on comparing the instance of the portion of the transactional data stored on the at least one of the plurality of the distributed ledger nodes against the instances of the portion of the transactional data stored on others of the plurality of distributed ledger nodes; and after the determining of the validity, transmitting the portion of the transactional data to an external node.

10. The system of claim 9, wherein the operations further comprise transmitting the electronic document to the external node.

11. The system of claim 9, wherein the portion of the transactional data is extracted based on an enumerated list defined by a third party, and wherein the operations further comprise providing the portion of the transactional data to the external node for transmission to the third party.

12. The system of claim 9, wherein the portion of transactional data extracted is based on an enumerated list defining required information for the document type.

13. The system of claim 9, wherein the plurality of distributed ledger nodes comprise at least one of a hyperledger node or a blockchain node.

14. The system of claim 9, wherein the operations further comprise storing the electronic document in a database.

15. The system of claim 9, wherein the transactional data includes at least one of a party identification, a distributed ledger technology (DLT) node identification, or a location of a party or node.

16. A non-transitory computer programmable product storing instructions which, when executed by at least one data processor forming part of at least one computing device, implement operations comprising:
receiving an electronic document comprising transactional data;
determining a document type;
extracting a portion of the transactional data from the electronic document based on the document type;
storing multiple instances of the portion of the transactional data on a plurality of distributed ledger nodes on a network, wherein the storing comprises selecting a type of the plurality of distributed ledger nodes on the network from among different types of distributed ledger nodes on the network based on the document type;
determining a validity of the instance of the portion of the transactional data stored on at least one of the plurality of distributed ledger nodes to detect tampering of the portion of the transactional data, the determining of the validity based on comparing the instance of the portion of the transactional data stored on the at least one of the plurality of the distributed ledger nodes against the instances of the portion of the transaction data stored on others of the plurality of distributed ledger nodes; and
after the determining of the validity, transmitting the portion of the transactional data to an external node.

17. The non-transitory computer programmable product of claim 16, wherein the operations further comprise transmitting the electronic document to the external node.

18. The non-transitory computer programmable product of claim 16, wherein the portion of the transactional data is extracted based on an enumerated list defined by a third party, and wherein the operations further comprise providing the portion of the transactional data to the external node for transmission to the third party.

19. The non-transitory computer programmable product of claim 16, wherein the plurality of distributed ledger nodes comprise at least one of a hyperledger node or a blockchain node.

* * * * *